(12) United States Patent
Kanbayashi

(10) Patent No.: US 7,835,063 B2
(45) Date of Patent: Nov. 16, 2010

(54) ELECTROPHORETIC DEVICE, ELECTROPHORETIC DISPLAY, AND ELECTRONIC APPARATUS

(75) Inventor: Hatsuki Kanbayashi, Suwa (JP)

(73) Assignee: Seiko Epson Corporation (JP)

( * ) Notice: Subject to any disclaimer, the term of this patent is extended or adjusted under 35 U.S.C. 154(b) by 960 days.

(21) Appl. No.: 11/669,429

(22) Filed: Jan. 31, 2007

(65) Prior Publication Data

US 2007/0177248 A1      Aug. 2, 2007

(30) Foreign Application Priority Data

Feb. 2, 2006 (JP) .............................. 2006-025762
Dec. 1, 2006 (JP) .............................. 2006-325367

(51) Int. Cl.
*G02B 26/00* (2006.01)

(52) U.S. Cl. ....................................... 359/296

(58) Field of Classification Search ................ 359/296, 359/245, 265; 204/450, 600; 430/32, 34, 430/38; 345/107, 105, 84, 55, 31, 30

See application file for complete search history.

(56) References Cited

U.S. PATENT DOCUMENTS 7,236,292 B2 * 6/2007 LeCain et al. ............... 359/296
7,643,874 B2 * 1/2010 Nitzan et al. ................. 604/20

FOREIGN PATENT DOCUMENTS

JP    64-086116    3/1989
JP    10-149118    6/1998

* cited by examiner

*Primary Examiner*—Scott J Sugarman
*Assistant Examiner*—Tuyen Q Tra
(74) *Attorney, Agent, or Firm*—Harness, Dickey & Pierce, P.L.C.

(57) ABSTRACT

An electrophoretic device includes an electro-optical panel including an electrophoretic layer having an electrophoretic dispersion containing electrophoretic particles dispersed in a liquid-phase disperse medium, wherein the electro-optical panel is enclosed with a single protective film folded, and a first portion of the protective film is bonded to a second portion of the protective film at a first bonding portion.

6 Claims, 7 Drawing Sheets

ELECTROPHORETIC DEVICE, ELECTROPHORETIC DISPLAY, AND ELECTRONIC APPARATUS

BACKGROUND

1. Technical Field

Several aspects of the present invention relate to an electrophoretic device, an electrophoretic display, and an electronic apparatus.

2. Related Art

Electrophoretic displays including an electrophoretic dispersion containing a liquid-phase dispersion medium and electrophoretic particles have been known, electrophoretic displays employing the fact that applying an electric field changes the distribution state of the electrophoretic particles to change optical properties of the electrophoretic dispersion.

Electrophoretic displays do not require backlights, thus reducing costs and thicknesses. Furthermore, electrophoretic displays have display-memory characteristics in addition to wide viewing angles and high contrast and thus have been receiving attention as the next-generation display device.

Electrophoretic displays each having a structure in which microcapsules containing an electrophoretic dispersion are disposed between a transparent substrate having a common electrode (transparent electrode) and a substrate having a driving electrode formed of a segment electrode have been known.

Microencapsulation of the electrophoretic dispersion can advantageously prevent a drain of the dispersion in production processes of electrophoretic displays and suppress precipitation and aggregation of electrophoretic particles. These substrates are composed of, for example, plastic in view of flexibility, non-fragility, a reduction in weight, and the like.

In recent years, microencapsulation of a disperse system in advance has been widely employed.

For example, JP-A-64-86116 discloses an electrophoretic display in which microcapsules containing a dispersion system are disposed between a pair of electrodes opposite each other, at least one of the pair of the electrodes being transparent.

JP-A-10-149118 discloses an electrophoretic display including a light-transmitting transparent substrate, an opaque back substrate opposite the transparent substrate, transparent electrodes disposed on opposed faces of the substrates, and many microcapsules disposed in an enclosed region between the transparent electrodes.

In this way, microencapsulation of a disperse system facilitates disperse-system-enclosing treatment and achieves a satisfactory display image.

In the case where plastic substrates are used in electrophoretic displays, plastic substrates allow water in air to permeate therethrough, thus providing insufficient blockage of water and the like. As a result, water permeating the plastic substrates enters the display to degrade the microcapsules. The degradation of the microcapsules disadvantageously reduces the lifetime of the electrophoretic displays.

To solve the problems, a method for laminating a protective film around an electrophoretic display (hereinafter, referred to as a "display") to seal the display with the protective film has been widely employed.

For example, as shown in FIG. 8, a display 64 is disposed between a pair of protective films 60 and 60. The protective films 60 and 60 are bonded at the periphery of the display 64 to form a seal 65, thereby sealing the entire display 64 with the protective films 60 and 60. As shown in the figure, it is necessary to use an adhesive 66 to bond the protective films 60 and 60.

SUMMARY

An advantage of some aspects of the invention is that an electrophoretic display which prevents the penetration of water and the like in air to have more satisfactory moisture resistance and an electronic apparatus are provided.

An electrophoretic device according to the invention includes an electro-optical panel including an electrophoretic layer having an electrophoretic dispersion containing electrophoretic particles dispersed in a liquid-phase disperse medium, wherein the electro-optical panel is enclosed with a single protective film folded, and a first portion of the protective film is bonded to a second portion of the protective film at a first bonding portion.

In the above-described electrophoretic device, the electro-optical panel is preferably enclosed so as to be disposed between the first bonding portion and a third portion of the protective film.

In the above-described electrophoretic device, preferably, a main surface of the electro-optical panel is enclosed so as to be disposed between the first bonding portion a third portion of the protective film, and the main surface of the electro-optical panel is covered with the third portion.

In the above-described electrophoretic device, in the case where the main surface of the electro-optical panel is used as a display portion or the like, a seamless portion of the protective film can be used as the third portion, thus improving visual identification. The seamless portion can be used as the third portion, thus reducing the effect of degradation factors, such as air and water, to the main surface.

In the above-described electrophoretic device, a fourth portion of the protective film may be bonded to a fifth portion of the protective film at a second bonding portion, and the electro-optical panel may be enclosed in such a manner that the first bonding portion is opposite the second bonding portion with the electro-optical panel provided therebetween.

In the case where the electro-optical panel is in the form of a rectangle, preferably, the rectangle has a first short side; a second short side opposite the first short side; a first long side intersecting with the first short side and the second short side and being longer than the first short side and the second short side; and a second long side intersecting with the first short side and the second short side and being opposite the first long side, both of the first portion and the second portion protrude outward from the first short side of the electro-optical panel, and both of the fourth portion and the fifth portion protrude outward from the second short side.

Alternatively, in the case where the electro-optical panel is in the form of a rectangle, preferably, the rectangle has a first short side; a second short side opposite the first short side; a first long side intersecting with the first short side and the second short side and being longer than the first short side and the second short side; and a second long side intersecting with the first short side and the second short side and being opposite the first long side, both of the first portion and the second portion protrude outward from the first short side of the electro-optical panel, and both of the fourth portion and the fifth portion protrude outward from the second short side.

In the above-described electrophoretic device, in the case where the electro-optical panel is in the form of a rectangle, preferably, the rectangle has a first short side; a second short side opposite the first short side; a first long side intersecting with the first short side and the second short side and being longer than the first short side and the second short side; and a second long side intersecting with the first short side and the second short side and being opposite the first long side, and the electro-optical panel includes a driving circuit disposed along at least one of the first long side and the second long side.

Preferably, the above-described electro-optical panel includes a plurality of terminals for electrically connecting the electro-optical panel and the outside of the electro-optical panel, and the plurality of the terminals are disposed along at least one of the first short side and the second short side.

To overcome the problems, an electrophoretic display includes a display portion including an electrophoretic layer having an electrophoretic dispersion containing electrophoretic particles dispersed in a liquid-phase disperse medium, the electrophoretic layer being disposed between a pair of substrates, wherein the display portion is enclosed with a single protective film folded, and ends of the protective film in the folding direction are overlapped and fixed at one of the front side and the back side of the display portion to form a seal.

The seal is preferably disposed at the back side of the display portion.

Preferably, the display portion is in the form of a rectangle, the folding direction of the protective film corresponds to the direction of the short side of the display portion, and the seal is thus disposed along the direction of the long side of the display portion.

According to the invention, the display portion preferably includes a driving circuit disposed along at least one of the first long side and the second long side.

Preferably, the display portion includes a plurality of terminals for electrically connecting the display portion to the outside of the display portion, and the plurality of the terminals are disposed along at least one of the first short side and the second short side.

The overlap width of the ends in the folding direction at the seal preferably ranges from half the length of the short side to the length of the short side of the display portion.

To overcome the problems, the invention provides an electrophoretic display including a display unit having an electrophoretic layer disposed between a pair of substrates, the electrophoretic layer provided with an electrophoretic dispersion containing electrophoretic particles dispersed in a liquid-phase disperse medium, and the display unit being sealed with a protective film. The display unit is enclosed with the single protective film folded. Ends of the protective film in the folding direction are overlapped and fixed at one of the front side and the back side of the display unit with an adhesive to form a folded seal.

According to the invention, the display unit is enclosed with the single protective film, and the ends are overlapped and fixed at one of the front side and the back side of the display unit, thus reducing the sealing region that may undergo the penetration of water and the like. This reduces the number of paths for the penetration of water and the like, thus enhancing sealing properties and improving moisture resistance. Furthermore, according to the invention, the folded seal is disposed at one of the front side and the back side, thus eliminating seals disposed at both sides of the display unit in the folding direction. As a result, the protrusion of seals all around the display unit is eliminated, thus resulting in the miniaturization of the display unit. Furthermore, the overlap width of the folded seal such that the penetration of water and the like can be sufficiently inhibited can be ensured, thus improving sealing properties. The penetration of water can be inhibited with high reliability, thus preventing the degradation of the microcapsules in the display unit and imparting satisfactory moisture resistance to the display unit. This can prevent a degradation in display performance and markedly improve the durability and life time of the display unit, thus maintaining satisfactory display performance over long periods of time.

In the electrophoretic display of the invention, the folded seal is preferably disposed at the back side of the display unit.

According to the structure, the folded seal is disposed at the back side of the display unit. For example, the front side of the display unit functions as a display surface where a viewer visually identifies an image, thus providing a satisfactory image for the viewer. Hence, the viewer can visually identify a clear image with comfortable feeling. Moreover, the folded seal is disposed at the backside of the display unit; hence, the aesthetics of the product is not degraded.

According to the electrophoretic display of the invention, in the case where the display unit has a rectangular shape, preferably, the folding direction of the protective film corresponds to the direction of the short side of the display unit, thus forming the folded seal along the long side of the display unit.

In general, in the case where an electrophoretic display is in the form of a rectangle when viewed in plan, a driving-circuit substrate (driving-circuit portion) is disposed at one side in the direction of the long side of the rectangle. According to this structure, the folded seal is disposed along the long side of the rectangular display unit to form a known sealing structure at both sides in the direction of the long side. Thus, the driving-circuit substrate and the like can also be connected as in the known art.

Furthermore, in the electrophoretic display of the invention, the folded seal has an overlap width ranging from half the length of the short side to the length of the short side of the display unit.

According to the structure, the overlap width is designed to range from half the length of the short side to the length of the short side, thus sufficiently inhibiting the penetration of water and the like. Hence, the moisture resistance at the folded seal is further improved, and the degradation in display performance due to the penetration of water and the like can be prevented. Thereby, the reliability as the product can be ensured.

An electronic apparatus of the invention includes any of the electrophoretic display.

This structure includes the electrophoretic display which has satisfactory moisture resistance and prevents the penetration of water and the like in air into the display unit. Thus, a high-quality, high-reliability electronic apparatus can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention will be described in detail below.

Figure 1:
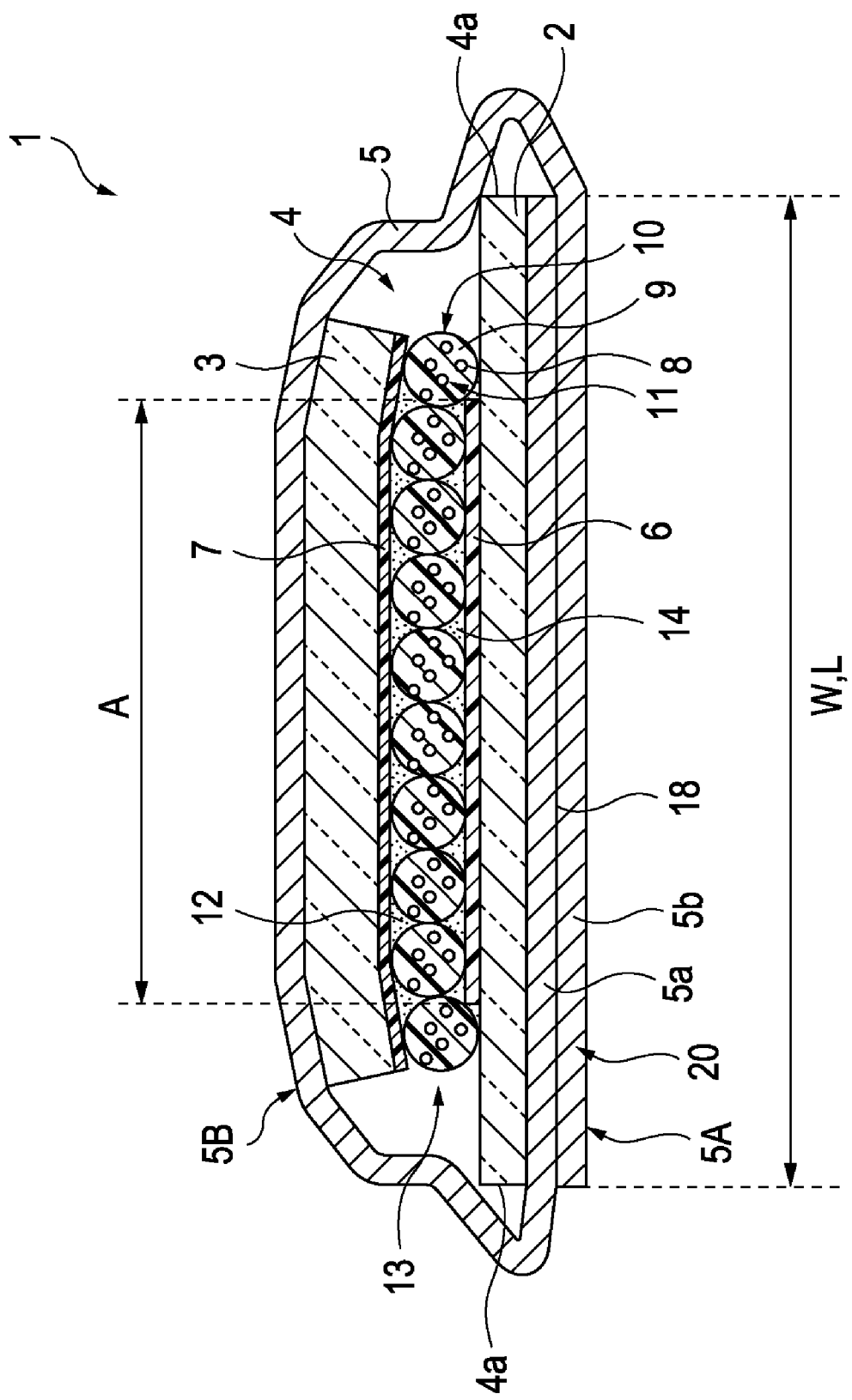
FIG. 1 is a schematic cross-sectional view showing a structure of an electrophoretic display according to the embodiment.

FIG. 1 shows an embodiment of an electrophoretic display 1 of the invention. In FIG. 1, reference numeral 1 represents an electrophoretic display. The electrophoretic display 1 includes a display unit 4 having a rectangular shape when viewed in plan; and a single protective film 5 with which the entire display unit 4 is enclosed. The display unit 4 includes a first substrate 2 having a segment electrode 6 (driving electrode); a second substrate 3 having a common electrode 7, the second substrate 3 being opposite the first substrate 2; and an electrophoretic layer 13 held by the substrates 2 and 3. The electrophoretic layer 13 has many microcapsules 10 each including an electrophoretic dispersion 11 containing a liquid-phase dispersion medium 9 and electrophoretic particles 8. The electrophoretic display 1 displays an image by applying an electric field to the electrophoretic dispersion 11 to change the distribution state of the electrophoretic particles 8.

Layers and components are shown at different scales so as to be recognizable in FIG. 1.

In particular, in the case where the electrophoretic display 1 needs to have flexibility like an IC card or electronic paper, film or sheet substrates each composed of a resin may be used as the first substrate 2 and the second substrate 3. On the other hand, in the case where the electrophoretic display 1 does not need to have flexibility like general panels, substrates each composed of glass, a hard resin, or a semiconductor material such as silicon may be used.

In this embodiment, the second substrate 3 side functions as a display surface seen by a user. Thus, the second substrate 3 disposed at the user side of the electrophoretic display 1 is composed of a transparent material having high transmittance. Examples of the material suitably used for the resin substrate include polyesters, such as polyethylene terephthalates (PETs) and polyethylene naphthalates (PENs); polyether sulfones (PESs); polycarbonates (PC); and polyethylenes (PE).

The common electrode 7 is formed by evaporation or the like on the entire inner surface of the second substrate 3. Examples of the common electrode 7 usable include conductive oxides such as indium-tin oxides (ITO); electronic conductive polymers such as polyanilines; and ionic conductive polymers each containing an ionic material, such as NaCl, LiClO4, or KCl, dispersed in a matrix resin, such as a polyvinyl alcohol resin or a polycarbonate resin. In this embodiment, an indium-tin oxide (ITO) is used.

On the other hand, the first substrate 2 opposite the second substrate 3 does not function as a display surface and thus does not need to have transparency (high transmittance). A polyimide (PI), a polyvinyl chloride (PVC), a polystyrene (PS), a polypropylene (PP), a polycarbonate (PC), a poly(ether ether ketone) (PEEK), a resin such as an acrylic or a polyacrylate, a liquid-crystal polymer, a metal such as stainless steel, or glass may be used in addition to the materials for the first substrate 2.

The segment electrode 6 having a predetermined shape is disposed on the inner surface of the first substrate 2. To ensure margins on the first substrate 2, the segment electrode 6 is formed in such a manner that gaps are formed between the segment electrode 6 and the periphery of the first substrate 2. The face (inner face) of the substrate having the gaps has step height due to the segment electrode 6. Examples of the material usable for the segment electrode 6 include conductive oxides such as indium-tin oxides (ITO); electronic conductive polymers such as polyanilines; and ionic conductive polymers each containing an ionic material, such as NaCl, LiClO4, or KCl, dispersed in a matrix resin, such as a polyvinyl alcohol resin or a polycarbonate resin; metals, such as aluminum, copper, gold, silver, platinum, nickel, and tin. In this embodiment, the segment electrode 6 is formed by a copper foil pattern.

The electrophoretic layer 13 disposed between the first substrate 2 and the second substrate 3 includes the microcapsules 10 densely arranged. As shown in FIG. 1, many microcapsules 10 are arranged at least on the segment electrode 6 and its periphery. The microcapsules 10 each contains the electrophoretic dispersion 11 having the electrophoretic particles 8 and the liquid-phase dispersion medium 9 for dispersing the particles therein, as described above. The microcapsules 10 have substantially the same diameter. In this embodiment, the microcapsules 10 each have a diameter of about 50 μm. To arrange the microcapsules 10 within a display region A regulated by the segment electrode 6, the microcapsules 10 are also arranged outside the display region A to ensure the margins described above. The second substrate 3 holding the electrophoretic layer 13 with the first substrate 2 is bonded along the arrangement of the microcapsules 10 as shown in the figure.

Applying an electric field to the electrophoretic dispersion 11 contained in the microcapsules 10 changes the distribution state of the electrophoretic particles 8 to change optical properties of the electrophoretic dispersion 11.

Examples of the liquid-phase dispersion medium 9 include a combination of a surfactant and the like with one or a mixture selected from water; alcohol solvents, such as methanol, ethanol, isopropanol, butanol, octanol, and methyl cellosolve; esters, such as ethyl acetate and butyl acetate; ketones, such as acetone, methyl ethyl ketone, and methyl isobutyl ketone; aliphatic hydrocarbons, such as pentane, hexane, and octane; alicyclic hydrocarbons, such as cyclohexane and methylcyclohexane; aromatic hydrocarbons such as long-chain alkyl group-containing benzenes, e.g. benzene, toluene, xylenes, hexylbenzene, heptylbenzene, octylbenzene, nonylbenzene, decylbenzene, undecylbenzene, dodecylbenzene, tridecylbenzene, and tetradecylbenzene; halogenated hydrocarbons, such as methylene chloride, chloroform, carbon tetrachloride, and 1,2-dichloroethane; carboxylates; and other oils.

The electrophoretic particles 8 are organic or inorganic particles (polymer or colloid) having a property in which the particles move in the liquid-phase dispersion medium 9 by electrophoresis due to a potential difference.

Examples of the electrophoretic particles 8 include black pigments, such as aniline black, carbon black, and titanium black; white pigments, such as titanium dioxide, zinc white, and antimony trioxide; azo pigments, such as monoazo, disazo, and polyazo; yellow pigments, such as isoindolinone, chrome yellow, yellow iron oxide, cadmium yellow, titan yellow, and antimony; azo pigments, such as monoazo, disazo, and polyazo; red pigments, such as quinacridone red and chrome vermilion; blue pigments, such as phthalocyanine blue, indanthrene blue, an anthraquinone dye, iron blue, ultramarine blue, and cobalt blue; green pigments such as phthalocyanine green. One or two or more of these may be used.

According to need, the pigment may further contain a charge control agent, such as particles composed of an electrolyte, a surfactant, metallic soap, a resin, rubber, an oil, a varnish, or a compound; a dispersant, such as a titanium coupling agent, an aluminum coupling agent, or a silane coupling agent; a lubricant; and a stabilizer.

Examples of the material constituting the film of each microcapsule 10 include composites of gum arabic and gelatin; and compounds, such as urethane resins, melanin resins, and urea resins.

In the electrophoretic display 1 according to this embodiment, two types of electrophoretic particles 8 are contained in the microcapsules 10. One is negatively charged. The other is positively charged. Examples of the two types of the electrophoretic particles 8 include titanium dioxide, which is a white pigment, and carbon black, which is a black pigment. Since such two types, i.e., white and black, of the electrophoretic particles 8, when a numeral and the like are displayed, for example, the numeral and the like may be displayed with the black electrophoretic particles 8. Alternatively, one type of the electrophoretic particles 8 alone may be used. In this case, a display may be performed by electrophoresis of the particles toward the common electrode 7 side or the segment electrode 6 side.

In particular, the microcapsules 10 are particularly fixed on a predetermined region on the common electrode 7 on the second substrate 3 with a binder 12. A binder having satisfactory affinity for the film of each microcapsule 10, excellent adhesion to the common electrode 7, and insulating properties may be used as the binder 12. Examples of thereof include thermoplastic resins, such as polyethylene, chlorinated polyethylene, ethylene-vinyl acetate copolymers, ethylene-ethyl acrylate copolymers, polypropylene, ABS resins, methyl methacrylates resins, vinyl chloride resins, vinyl chloride-vinyl acetate copolymers, vinyl chloride-vinylidene chloride copolymers, vinyl chloride acrylate copolymers, vinyl chloride-methacrylic acid copolymers, vinyl chloride-acrylonitrile copolymers, ethylene-vinyl alcohol-vinyl chloride copolymers, propylene-vinyl chloride copolymers, vinylidene chloride resins, vinyl acetate resins, polyvinyl alcohol, polyvinyl formal, and cellulose resins; polymers, such as polyamide resins, polyacetal, polycarbonate, polyethylene terephthalate, polybutylene terephthalate, polyphenylene oxide, polysulfone, polyamide-imide, polyaminobismaleimide, polyether sulfone, polyphenylene sulfone, polyalylate, graft polyphenylene ether, polyether ethyl ketone, and polyether-imides; fluorinated resins, such as polytetrafluoroethylene, poly(fluorinated ethylene propylene), tetrafluoroethylene-perfluoroalkoxyethylene copolymers, perfluoroalkoxyethylene copolymers, ethylene-tetrafluoroethylene copolymers, polyvinylidene fluoride, and fluorocarbon rubber; silicone resins, such as silicone resins and silicone rubber; and other compounds, such as methacrylic acid-styrene copolymers, polybutylene, and methyl methacrylate-butadiene-styrene copolymers.

On the other hand, the microcapsules 10 are fixed on the segment electrode 6 on the first substrate 2 and the periphery of thereof with an adhesive sheet 14. The microcapsules 10 on the second substrate 3 are fixed to the adhesive sheet 14; hence, many microcapsules 10 are held and fixed on the first substrate 2. Examples of the material for the adhesive sheet 14 include thermoplastic resins and ultraviolet-curable resins in addition to thermosetting resins.

The entire display unit 4 is enclosed with the single protective film 5. The protective film 5 has a size such that the entire display unit 4 is enclosed with the protective film 5 and has, for example, a rectangular shape. As shown in FIG. 1, the single protective film 5 is folded along the display unit 4 in a single direction (folding direction. In this embodiment, the folding direction of the protective film 5 corresponds to the direction of the short side of the display unit 4.

Both ends 5a and 5b of the protective film 5 are overlapped and bonded to each other with a first adhesive 18 to a unitary folded seal 20. The folded seal 20 extends along the long side of the display unit 4. The overlap width W is designed to range from half the short-side length L to the short-side length L of the display unit 4. In the case where the overlap width W is set to be a length corresponding to the short-side length L of the display unit 4, the size of the protective film 5 and the position where the protective film 5 is folded are easily set, thus facilitating the production. Furthermore, the widest overlap width W can be achieved within the allowable range to further improve moisture resistance, thus resulting in the seal with higher airtightness.

In this way, the folded seal 20 is disposed at the backside of the display unit 4 and thus does not cause obstruction to the visual identification of an image made by a viewer who looks at the image from the side of the surface of the display unit 4, i.e., from the second substrate 3 side, functioning as the display surface.

Figure 2:
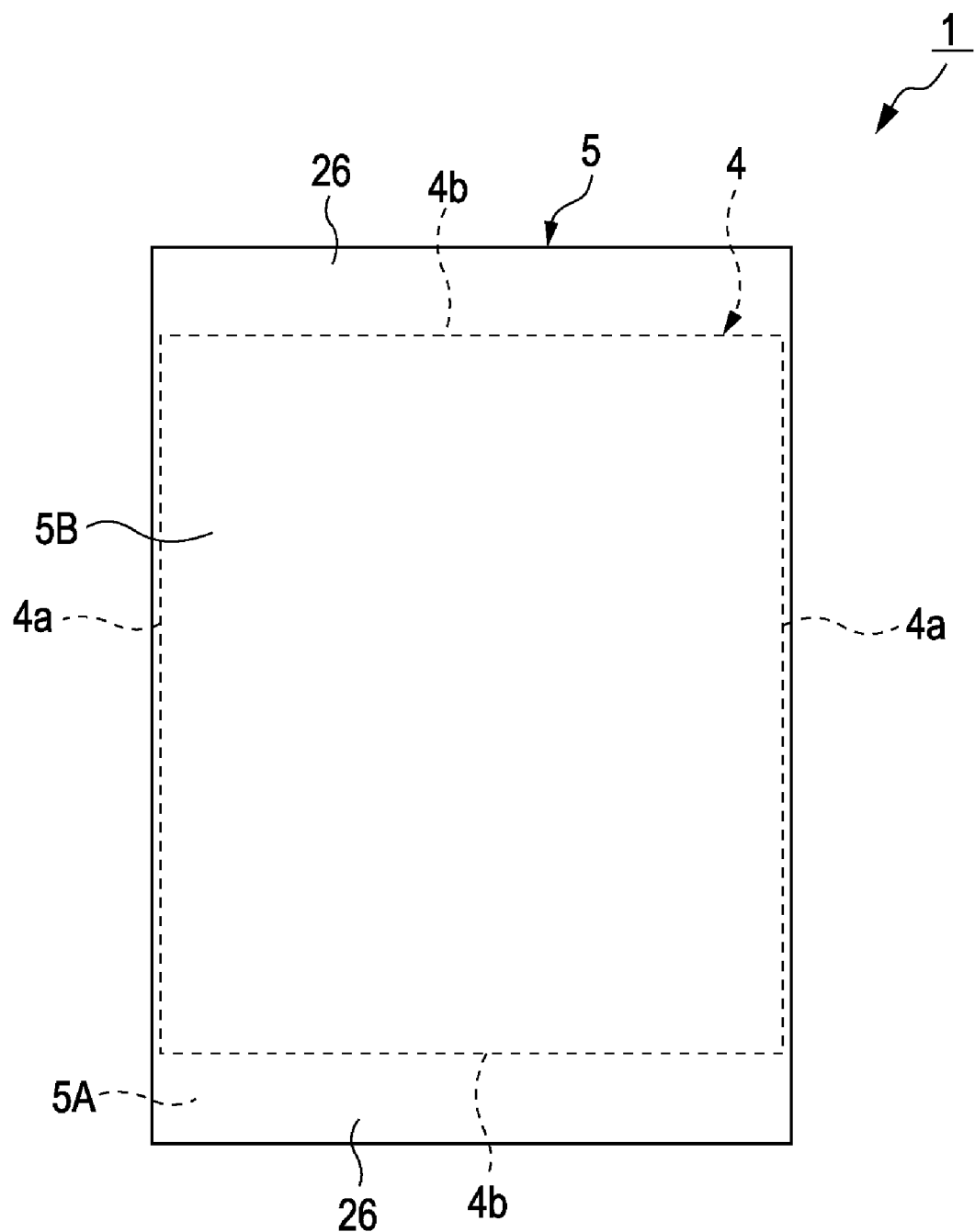
FIG. 2 is a schematic plan view showing a structure of the electrophoretic display according to the embodiment.

In the protective film 5, the folded-seal 20 side is defined as a backside 5A, and a side opposite the backside 5A with the display unit 4 provided therebetween is defined as a front 5B. As shown in FIG. 2, the front 5B and the backside 5A of the protective film 5 are bonded to each other with a second adhesive (not shown) at both sides of the long side of the display unit 4 to form side seals 26 and 26. That is, the both ends of the long side of the display unit 4 are sealed with the side seals 26 and 26.

The folded seal 20 and the side seals 26 and 26 are formed by welding using laser irradiation or ultrasonic treatment. After cooling and solidification, the melted portions are integrally bonded to each other to form the folded seal 20 and the side seals 26 and 26.

The protective film 5 has a two-layer structure of a resin layer composed of a polymeric material and a barrier layer composed of an inorganic material. When the pair of the substrates 2 and 3 is enclosed with the protective film 5, the protective film 5 is disposed in such a manner that the barrier layer faces the substrates. When the protective film 5 is disposed in such a manner that the barrier layer faces the outside, water can penetrate the inside through a defective portion of the barrier layer. Since the protective film 5 is disposed in such a manner that the barrier layer faces the substrates, the outer resin layer can prevent the penetration of water and the like from the outside even when a defective portion occurs in the barrier layer. The resin layer has high water-barrier properties but often has water absorbency. When the protective film 5 is disposed in such a manner that the resin layer faces the substrates, water absorbed in the resin layer can permeate the inside the display unit 4. The protective film 5 is disposed in such a manner that the resin layer faces the outside, thereby preventing the direct penetration of water and the like from the resin layer into the display unit 4.

Examples of the material suitable for the barrier layer include inorganic materials, such as silicon oxide, silicon nitride, aluminum oxide, and titanium oxide. Alternatively, metal foil, such as aluminum foil, copper foil, or Kovar foil is suitably used.

Examples of the material suitable for the resin layer include polyesters, such as polyethylene terephthalate (PET), polyethylene (PE), polypropylene (PP), polyether sulfone (PES), and polyethylene naphthalate (PEN); and resins such as polycarbonate (PC). Alternatively, metal foil, such as aluminum foil, copper foil, or Kovar foil, or a laminate of a thin metal film and a resin film is suitably used.

The first adhesive 18 is applied to one of the inner and outer faces of one end of the protective film 5 in the folding direction within the range such that the folded seal 20 can be formed. Sealing is performed by bonding the one end to the other end with the first adhesive 18 provided therebetween. In this embodiment, the end 5b is laminated on the end 5a of the protective film 5 in the folding direction. Thus, the first adhesive 18 is applied to the outer face of the end 5a. Alternatively, the first adhesive 18 may be applied to the inner face of the end 5b. In any case, the first adhesive 18 is applied in such a manner that the ends 5a and 5b are surely bonded to each other.

The second adhesive is applied to predetermined areas of the both ends of the protective film 5 along short sides 4b of the display unit 4 to be enclosed. That is, the second adhesive is applied to the areas corresponding to the side seals 26 and 26 described above. The ends of the protective film 5, i.e., the ends of the front 5B and the backside 5A, in the direction of the long side of the display unit 4 are bonded to each other along the short sides 4b of the display unit 4.

The entire display unit 4 is enclosed with the single protective film 5 using the first adhesive 18 and the second adhesive. Examples of the material for the first adhesive 18 and the second adhesive include resins, such as epoxy resins, silicone resins, and acrylic resins; and a mixture of an inorganic filler, such as silicon nitride, and one of these resins.

Method for Producing Electrophoretic Display

A method for producing the above-described electrophoretic display will be described below with reference to FIGS. 1 to 4.

A method for forming the display unit 4 will be simply described.

The rectangular first substrate 2 composed of a polyimide is prepared. The segment electrode 6 having a predetermined shape is formed in the display region A on the first substrate 2 by a semiadditive process or the like. According to need, a flexible driving-circuit substrate (not shown) is connected to one end of the first substrate 2 in the direction of the long side.

The rectangular second substrate 3 composed of transparent polyethylene terephthalate (PET) is prepared. The common electrode 7 composed of ITO is formed by evaporation on the entire inner face of the second substrate 3.

Many microcapsules 10 are fixed by printing or the like on the surface of the common electrode 7 on the second substrate 3 with the binder 12 to form the electrophoretic layer 13. The adhesive sheet 14 is bonded onto the segment electrode 6 and the periphery of the segment electrode 6 on the first substrate 2. In this way, the second substrate 3 is disposed so as to be opposite the first substrate 2 having the adhesive sheet 14. The electrophoretic layer 13 side of the second substrate 3 is pressed against the segment electrode 6 side of the first substrate 2, and then the substrates 2 and 3 are laminated. In this case, the first substrate 2 and the second substrate 3 opposite each other are transferred into a vacuum laminator 19 (see FIG. 4) and are bonded to each other with the vacuum laminator 19.

Vacuum Laminator

Figure 4:
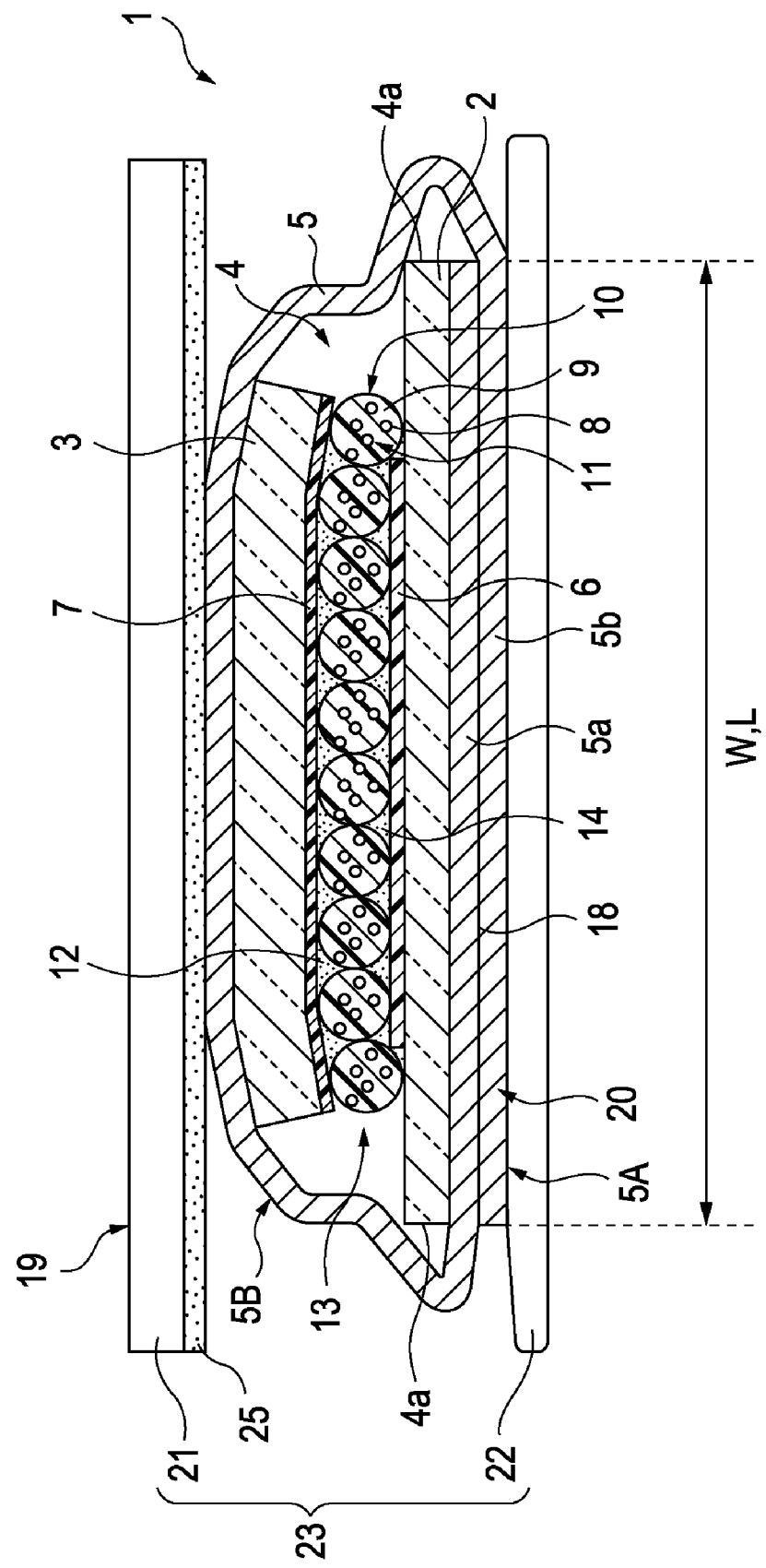
FIG. 4 is a cross-sectional view illustrating a step of enclosing a display unit with a protective film using a vacuum laminator.

As shown in FIG. 4, the vacuum laminator 19 includes a press unit 23 having an upper holder 21 provided with a heater and a lower holder 22 provided with a heater, the lower holder 22 being opposite the upper holder 21; and a vacuum unit connected to the press unit 23.

The upper holder 21 includes cushioning 25 composed of silicone rubber or the like, the cushioning 25 being disposed at the inner side of the upper holder 21. The lower holder 22 has a balloon shape which can be inflated with air and which is composed of silicone rubber or the like. The lower holder 22 is inflated with air. The lower holder 22 is brought into close contact with the first substrate 2 so as to fit in the shape of the first substrate 2 by adjusting the degree of swelling, thereby uniformly pressurizing the first substrate 2. Hence, the substrates 2 and 3 are appropriately and uniformly pressurized with the cushioning 25 and the lower holder 22 without applying an excessive load to the microcapsules 10.

To laminate the substrates 2 and 3 with the vacuum laminator 19, first, the vacuum laminator 19 in which the first substrate 2 and the second substrate 3 are placed is evacuated with the vacuum unit. The lower holder 22 is inflated by blowing air with the evacuation of the vacuum laminator 19 to elastically deform the cushioning 25 and the lower holder 22 along the external contour of the display unit 4, thus uniformly pressurizing the substrates 2 and 3. Simultaneously, the substrates 2 and 3 are heated to, for example, about 100° C. with the heaters attached to the upper holder 21 and the lower holder 22 to cure the adhesive sheet 14 adhering to the segment electrode 6 on the first substrate 2 and the periphery of segment electrode 6, thereby laminating the first substrate 2 and the second substrate 3.

The pair of the first substrate 2 and the second substrate 3 opposite each other are disposed between the upper holder 21 and the lower holder 22 and then subjected to thermal compression bonding to form the rectangular display unit 4 holding the microcapsules 10 between the substrates 2 and 3.

The singe rectangular protective film 5 that is in the form of a rectangle is prepared. The first adhesive 18 is applied to an area corresponding to the folded seal 20 of the end 5a in the folding direction (the outer side of the protective film 5). The second adhesive is applied to areas corresponding to the side seals 26 and 26 (the inner face of the protective film 5) of both ends in the direction perpendicular to the folding direction of the protective film 5. The display unit 4 is placed at the substantially middle portion of the inner face of the protective film 5 in such a manner that the direction of the short side of the display unit 4 corresponds to the folding direction of the protective film 5.

Figure 3:
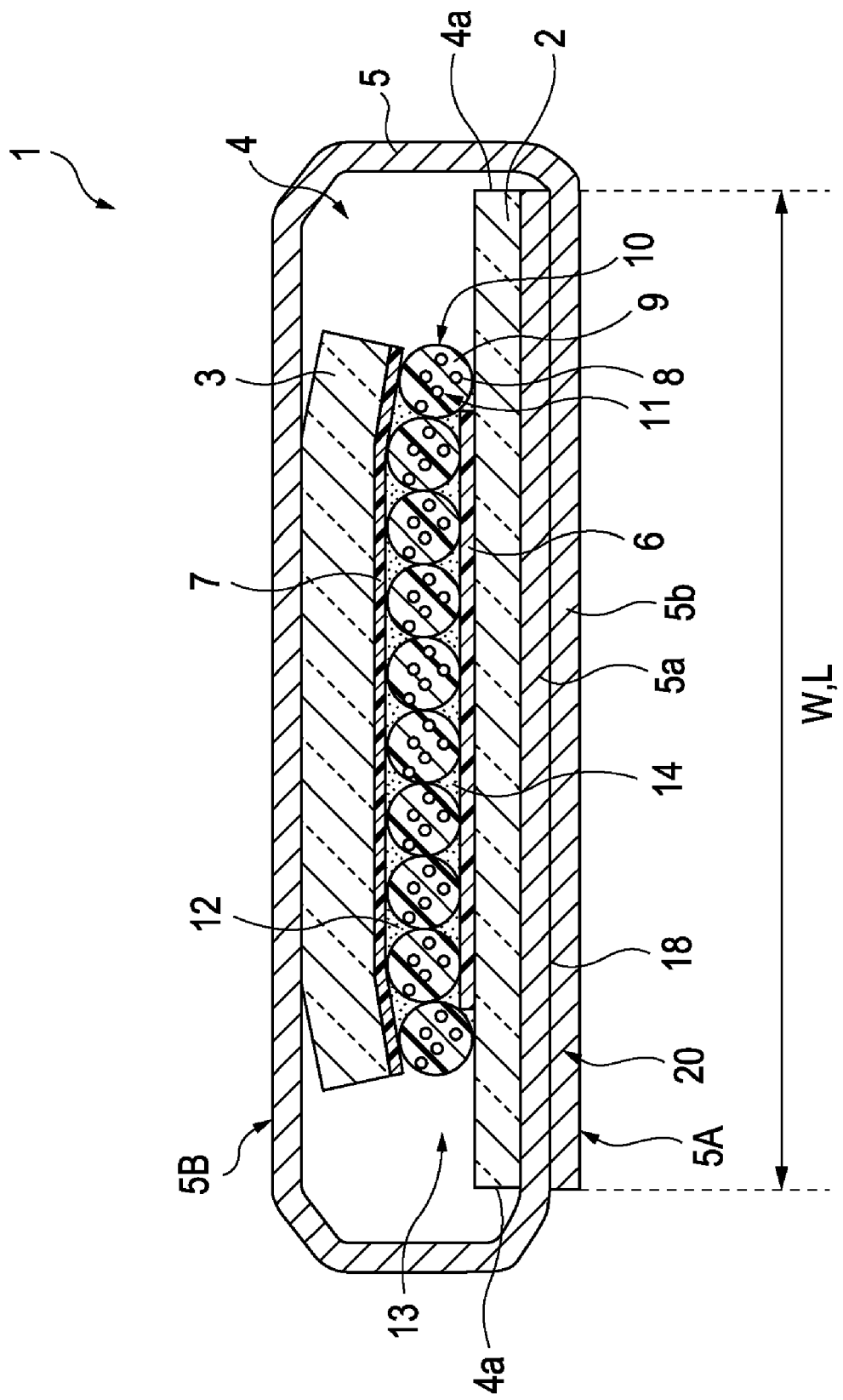
FIG. 3 is a cross-sectional view illustrating a step of enclosing a display unit with a protective film.

As shown in FIG. 3, the side of the end 5a to which the first adhesive 18 is applied is folded toward the backside of the display unit 4 in such a manner that the folding position corresponds to the long side 4a of the display unit 4. Subsequently, the side of the end 5b without any adhesive is folded toward the backside of the display unit 4 to fix the end 5a to the end 5b overlapping the end 5a with the first adhesive 18. Thereby, the folded seal 20 is formed at the backside of the display unit 4 and disposed along the direction of the long side of the display unit 4.

Next, the side seals 26 and 26 are formed with the vacuum laminator 19.

The display unit 4 wrapped with the protective film 5 is transferred into the vacuum laminator 19 shown in FIG. 4. The display unit 4 is placed in the press unit 23 of the vacuum laminator 19. The press unit 23 is evacuated with the vacuum unit.

The lower holder 22 is inflated by blowing air with the evacuation of the press unit 23 to deform the cushioning 25 and the lower holder 22 along the external contour of the display unit 4. As a result, the ends of openings of the protective film 5 that is in the form of a substantially rectangular cylinder extends along the direction of the short side of the display unit 4. Thus, the ends of the front 5B overlap the respective ends of the backside 5A. The overlapping ends are integrally bonded to each other with the second adhesive. Thereby, as shown in FIG. 2, the side seals 26 and 26 are formed at both outer sides in the direction of the long side of the display unit 4 to seal the entire display unit 4 with the single protective film 5.

In this embodiment, the display unit 4 is enclosed with the single protective film 5, thus reducing the sealing region that may undergo the penetration of water and the like. This reduces the number of paths for the penetration of water and the like, thus improving the moisture resistance at the periphery of the electrophoretic display 1. The folded seal 20 is disposed along the face of the substrate of the display unit 4; hence, the seal does not protrude from the perimeter of the display unit 4, resulting in the miniaturization of the display unit 4. Furthermore, the overlap width W of the folded seal 20 can be sufficiently ensured, thus inhibiting the penetration of water and the like over long periods of time. This prevents the degradation of the microcapsules 10 in the display unit 4 to impart excellent moisture resistance to the display unit 4. Hence, the degradation of the display performance of the display unit 4 is prevented to markedly improve the durability and lifetime of the display unit 4, thus maintaining a satisfactory quality of the electrophoretic display 1.

Furthermore, the folded seal 20 is disposed at the backside of the display unit 4, thus providing a satisfactory image for a viewer who looks at the image from the front side. Hence, the viewer can visually identify a clear image with comfortable feeling. Moreover, the folded seal 20 is disposed at the backside of the display unit 4; hence, the aesthetics of the product is not degraded.

Furthermore, the folded seal 20 is formed along the long side of the rectangular display unit 4, thus facilitating the production than the case where the folded seal 20 is formed along the short side. The side seals 26 and 26 are disposed along the short side 4b of the display unit 4, thus reducing the sealing length of the side seals 26 and 26.

Therefore, the number of paths for the penetration of water and the like from the outside is reduced to prevent the degradation of moisture resistance. Thus, the degradation of the microcapsules 10 can be inhibited, thereby maintaining a satisfactory quality of the display unit 4.

The side seals 26 and 26 are disposed so as to protrude outward from both sides in the direction of the long side of the display unit 4 to form a known sealing structure. Thus, a driving-circuit substrate and the like can also be connected as in the known art. For example, one of the side seals 26 and 26 can be connected to a flexible driving-circuit substrate.

The overlap width W of the folded seal 20 is set to a width corresponding to the short-side length L of the display unit 4; hence, the penetration of water and the like through the folded seal 20 can be sufficiently inhibited, thus further improving the moisture resistance of the folded seal 20 and surely preventing a degradation in display performance due to the penetration of water and the like. Therefore, the reliability of the product can be ensured.

Electronic Apparatus

An electronic apparatus of the invention will be described below. The electronic apparatus of the invention includes the above-described electrophoretic display.

Examples of the electronic apparatus including the electrophoretic display will be described below.

Wrist Watch

Figure 5:
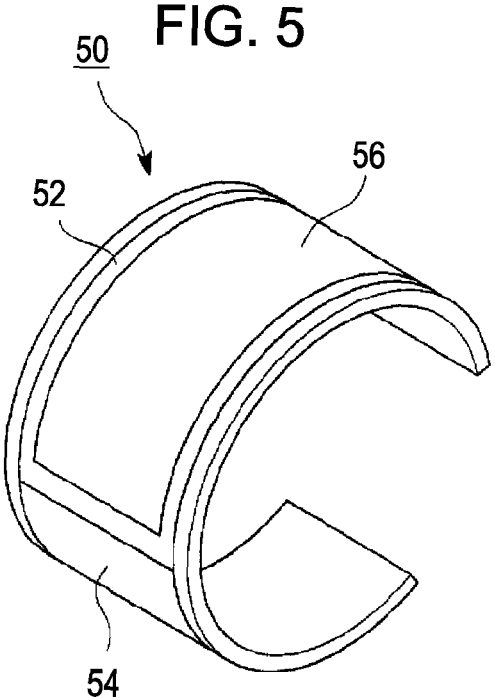
FIG. 5 is a perspective view of the appearance of a wrist watch.

An example in which the electrophoretic display is applied to a display portion of a wrist watch will be described below. FIG. 5 is a schematic perspective view showing the structure of a wrist watch 50. As shown in FIG. 5, the wrist watch 50 includes a display portion 56 that displays a time, a watch housing 52 as a frame of the display portion 56, and a watch band 54 attached to the watch housing 52. In the wrist watch 50 according to this embodiment, the display portion 56 of the watch is curved so as to wind around an arm of a user of the wrist watch 50.

Mobile Phone

Figure 6:
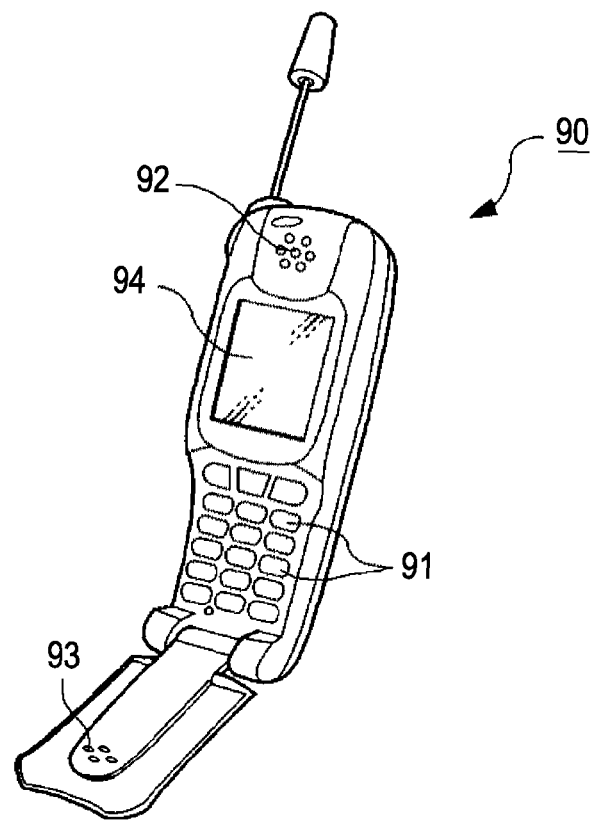
FIG. 6 is a perspective view of the appearance of a mobile phone.

An example in which the electrophoretic display is applied to a display portion of a mobile phone will be described below. FIG. 6 is a perspective view showing the structure of a mobile phone 90. As shown in FIG. 6, the mobile phone 90 includes a plurality of operation buttons 91, an ear piece 92, a mouthpiece 93, and a display portion 94.

Electronic Paper

Figure 7:
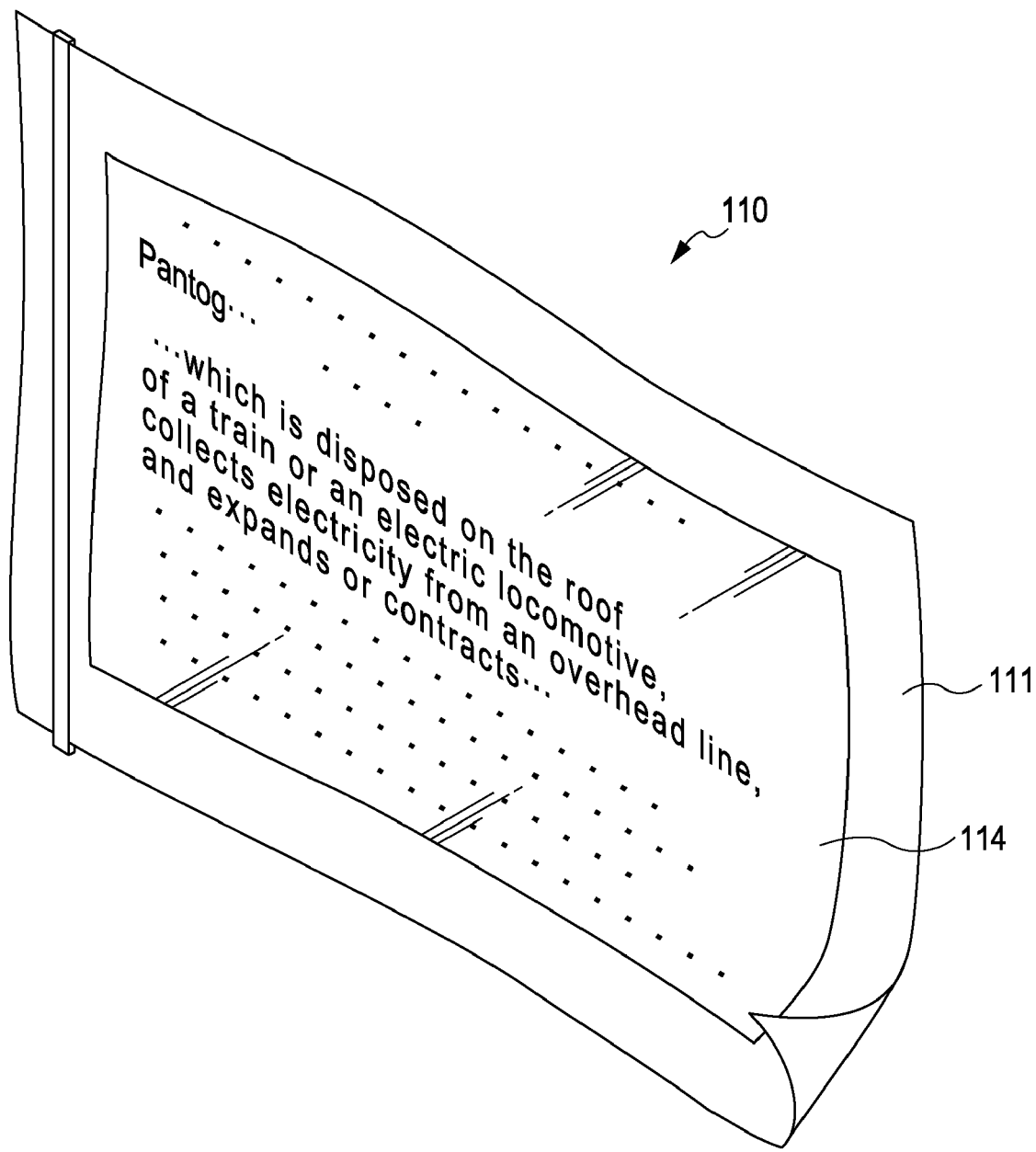
FIG. 7 is a perspective view of the appearance of electronic paper.
Figure 8:
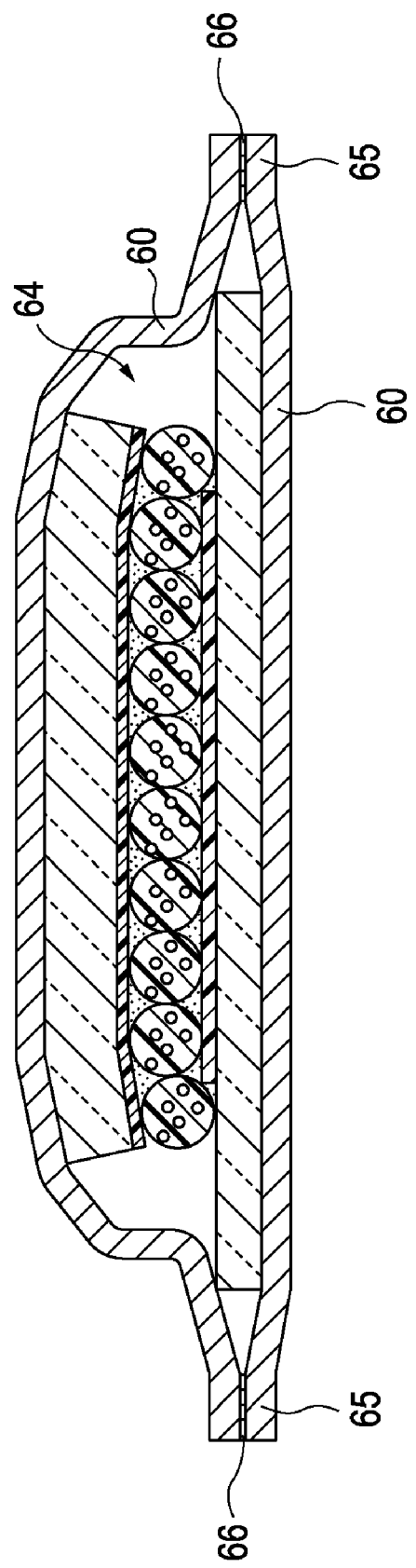
FIG. 8 is a schematic cross-sectional view showing a structure of a known electrophoretic display.

An example in which the electrophoretic display is applied to a display portion of electronic paper will be described below. FIG. 7 is a perspective view showing the structure of the electronic paper 110. The electronic paper 110 includes a main body 111 formed of a rewritable sheet having a texture and flexibility similar to paper and a display unit having a display portion 114.

The electronic apparatus according to this embodiment includes the electrophoretic display 1 which has satisfactory moisture resistance and prevents the penetration of water and the like in air into the display unit 4. Thus, a high-quality, high-reliability electronic apparatus can be provided.

Examples of the electronic apparatus include electronic notebooks, personal computers, IC cards having fingerprint detectors, electronic books, viewfinder type or direct viewing type video tape recorders, car navigation systems, pagers, personal digital assistants, desktop electronic calculators, word processors, workstations, videophones, POS terminals, and devices having touch panels in addition to the wrist watch, the mobile phone, and the electronic paper, which include the electrophoretic displays 1 as display portions.

The technical range of the invention is not limited to the above-described embodiments. Various modifications may be made without departing from the gist of the invention.

For example, in the above-described embodiment, the examples including the microcapsules 10 have been described. Alternatively, an electrophoretic dispersion layer containing the electrophoretic particles 8 dispersed in the liquid-phase dispersion medium 9 may be disposed between the pair of the substrates 2 and 3.

Furthermore, the adhesive sheet 14 for bonding the substrates 2 and 3 is not disposed on the segment electrode 6 but may be disposed on the microcapsules 10.

What is claimed is:

1. An electrophoretic display comprising:
   a display portion including an electrophoretic layer having an electrophoretic dispersion containing electrophoretic particles dispersed in a liquid-phase disperse medium, the electrophoretic layer being disposed between a pair of substrates, wherein the display portion is enclosed with a single protective film folded, and ends of the protective film in the folding direction are overlapped and fixed at one of the front side and the back side of the display portion to form a seal.

2. The electrophoretic display according to claim 1, wherein the seal is disposed at the back side of the display portion.

3. The electrophoretic display according to claim 2, wherein the display portion is in the form of a rectangle, the folding direction of the protective film corresponds to the direction of the short side of the display portion, and the seal is thus disposed along the direction of the long side of the display portion.

4. The electrophoretic display according to claim 1, wherein the display portion includes a driving circuit disposed along at least one of the first long side and the second long side.

5. The electrophoretic display according to claim 1, wherein the display portion includes a plurality of terminals for electrically connecting the display portion to the outside of the display portion, and the plurality of the terminals are disposed along at least one of the first short side and the second short side.

6. The electrophoretic display according to claim 1, wherein the overlap width of the ends in the folding direction at the seal ranges from half the length of the short side to the length of the short side of the display portion.

* * * * *